Patented Dec. 11, 1951

2,577,840

UNITED STATES PATENT OFFICE 2,577,840

COMPOSITIONS FOR USE IN TREATING FIBROUS MATERIALS TO IMPART WATER REPELLENCY

Robert R. Burnham, Buffalo, Arnold T. Anderson, Tonawanda, and Arthur M. Matheson, Niagara Falls, N. Y., assignors, by mesne assignments, to Union Carbide and Carbon Corporation, a corporation of New York No Drawing. Application June 22, 1950,
Serial No. 169,795

5 Claims. (Cl. 260—23)

This invention relates to compositions for use in treating fibrous materials to impart water repellency, and more particularly to water miscible compositions which can be mixed or diluted with water to form a bath, in which the fibrous materials are treated for rendering the same water repellent.

Such treatment may follow laundering, to render the material water repellent between launderings. Certain of the ingredients may wash out in the laundering, so that the compositions and the treatment may be designated as non-durable or semi-permanent. However, such treatment may be applied in the mill for rain wear, curtains, draperies, table linens, paper, leather, etc. and the water repellency may be incidental to other desired qualities.

Heretofore all non-durable water repellent formulations have been sold and stored as emulsions containing relatively large proportions of water. The weight and volume of the water, as much as 75% of the composition, increases the charges for shipping the composition, and the size of the container, and the chemical effect of the water increases the cost of packaging and storage, by requiring corrosion resistant containers. The preparation of such emulsion has generally required the use of special equipment such as colloid mills, with attendant capital investment and cost of maintenance and operation.

Furthermore, storage and shipping involve an emulsion stability problem, to prevent the emulsion from breaking into layers or precipitating and agglomerating into non-homogeneous masses. Severe temperature changes are particularly destructive of emulsions.

It is the main object of the present invention to provide a water repellent composition which can be prepared, stored and shipped as a dry solid and diluted for use without difficult manipulations or special equipment.

The dry solid is not necessarily anhydrous, because water of crystallization is generally present, but the composition is of definitely solid, preferably pulverent form, as powder, flakes, granules, etc.

According to the present invention the ingredients comprise a wax, an emulsifier, a dissociable metallic salt, a buffer, and an emulsion stabilizer.

The waxes employed are: vegetable waxes, such as carnauba, Japan, candelilla, palm, and ouricuri; insect waxes, such as beeswax; petroleum waxes such as paraffin, microcrystalline and caresin waxes; synthetic waxes, such as Acrowax, Armorwax, synthetic paraffins, and Opalwax. Blends of these waxes are also desirable. 1 or example, carnauba wax in paraffin raises the melting point of paraffin considerably and in some cases gives results similar to pure carnauba. Also small percentages of various other of the above waxes give definite qualities to paraffin which may be used to obtain a desired textile finish.

The economically preferred wax is paraffin, with a melting point between just above room temperature to laundering temperatures, say 90° C. Paraffin wax melting in the range from 51° to 53° C. is preferred because it is economical, easily formulated, and gives a particularly good hand to treated fabric. The proportion of wax may be 35 to 70 parts by weight, the higher percentage being preferred for economy.

The emulsifier is dry powdered polyvinyl alcohol of a saponification number of 0 to 20, preferably prepared by hydrolizing polyvinyl acetate to 98.6% polyvinyl alcohol. The proportion of polyvinyl alcohol is 1 to 20 parts by weight. A larger proportion would merely be a waste of this ingredient, and a smaller proportion would render the ultimately resulting emulsion unstable. Of this range, the proportion of 12 parts by weight is preferred for best results.

The dissociable metal salt is preferably a water soluble basic aluminum acetate, but it may be substituted by zirconyl acetate, ammonium zirconyl carbonate, zirconyl oxychloride, aluminum formate, metallic propionates and metallic butyrates. The proportion of dissociable metal salts is 10 to 20 parts by weight.

The buffer is sodium diacetate. The proportion of 1 to 10 parts by weight is preferred, less than one part being ineffective and more than 10 parts introducing too much sodium ion which affects the functioning of the aluminum ion.

The emulsion stabilizer is an amine. Octadecylamine is preferred because it is effective, has substantially no odor, and is not too volatile. Other aliphatic amines can be used, such as triethanolamine. Aromatic amines may also be used such as diphenylamine and dimethylaniline. The preferred proportion is 0.5 to 1.5 parts for proper emulsion stability. A larger proportion diminishes the water repellency, and in the case of liquid amines such as triethanolamine a larger proportion would impair the dry pulverent character of the composition.

The preferred components and proportions of the composition are as follows:

| Components: | Parts by weight |
|---|---|
| Refined paraffin wax, M. P. 51–53° C. | 35 to 70 |
| Octadecylamine | 1 to 2 |
| Polyvinyl alcohol | 12 to 20 |
| Water soluble basic aluminum acetate ($Al_2O_3$, 35 to 37%) | 10 to 20 |
| Sodium diacetate | [1] 1 to 10 |

[1] May be omitted depending on the results required.

The composition is prepared by blending the powdered dry components. The wax is melted and other dry components dispersed in the liquefied wax then processed to produce flakes, powder, granules or slabs, or any acceptable solid form.

The above dry mixture may be made into a concentrated stock emulsion, readily diluted with warm water, by adding to it 200 parts by weight of water at 55 to 100° C. while stirring. If preferred, a solid emulsion can be prepared by adding the above dry mixture to 75 parts of water.

For treating cloth for water repellency, a 0.7% water dispersion of the composition is made by adding either the dry composition, or either concentrated emulsion, to water at 60–65° C. with stirring. The pH of the resulting operating bath is in the range of 3.5 to 4.5 and may be adjusted for special uses by adding acetic acid.

The material to be treated is completely immersed in the 0.7% water dispersion at 60–65° C. for 5 minutes. The excess liquid is removed by a wringer or an extractor, and the cloth dried by conventional methods, such as air drying by tumbler drying cans, tenter frames or ironing at approximately 120° C.

Specific examples of the invention are as follows:

Example 1

| Components: | Parts by weight |
|---|---|
| Paraffin wax, M. P. 51–53° C. | 70 |
| Octadecylamine | 1 |
| Polyvinyl alcohol | 12 |
| Water soluble basic aluminum acetate | 19.6 |
| Sodium diacetate | 10 |

A dry mix is made of these components in any order convenient to the equipment used. This mix is added to 200 parts of water at 55–100° C. with rapid stirring for five minutes. The resulting emulsion is then diluted with water to the required 0.7% strength based on the solid composition.

Example 2

The components and proportions given in Example 1 are assembled as follows:

The paraffin is heated to about 55° C., and the other dry components are added while stirring the melted paraffin. Further procedure is as in Example 1.

Example 3

To the components of Example 1 or 2 are added 74.5 parts of water. The resulting paste is suitable for shipment. To make the same into the concentrated emulsion, about 125 parts of water at 60 to 60° C. are added. For the water repellent bath, the concentrated emulsion is made into a 2% dispersion with water.

Example 4

| Components: | Parts by weight |
|---|---|
| Water | 200.00 |
| Paraffin, M. P. 51–53° C. | 70.00 |
| Water soluble basic aluminum acetate | 19.06 |
| Polyvinyl alcohol | 12.00 |
| Octadecylamine | 1.04 |
| Sodium diacetate | 5.0 |

The sodium diacetate is added to the water. The polyvinyl alcohol is dissolved in the solution and heated to 80° C.

The paraffin is heated to 80° C. and the octadecylamine added. This mix is added to the first solution while stirring. The agitation is continued at 80° C. for five minutes. The water soluble basic aluminum acetate is added, and rapid agitation is continued for an additional five minutes. The mixture is permitted to cool to 65° C., stirring speed is reduced and agitation continued until room temperature is reached. The treatment of the material with a 2% water dispersion of the above is the same as in the other examples.

We claim:
1. A solid mixture adapted to be mixed with water to form a water repellent bath, comprising by weight 35 to 70 parts wax, 1 to 2 parts amine emulsion stabilizer, 12 to 20 parts emulsifier consisting of polyvinyl alcohol, 10 to 20 parts water soluble fatty acid salt of a metal of the group consisting of aluminum and zirconium, and up to 10 parts dry buffer containing sodium diacetate.

2. A solid mixture adapted to be mixed with water to form a water repellent bath, comprising by weight 35 to 70 parts wax, 1 to 2 parts amine emulsion stabilizer, 12 to 20 parts emulsifier consisting of polyvinyl alcohol having a saponification number below 20, 10 to 20 parts water soluble fatty acid salt of a metal of the group consisting of aluminum and zirconium, and up to 10 parts dry buffer containing sodium diacetate.

3. A solid mixture adapted to be mixed with water to form a water repellent bath, comprising by weight 35 to 70 parts paraffin wax having a melting point between 51 and 53° C., 1 to 2 parts amine emulsion stabilizer, 12 to 20 parts polyvinyl alcohol having a saponification number below 20, 10 to 20 parts water soluble basic aluminum acetate, and up to 10 parts sodium diacetate.

4. A composition of matter adapted to be mixed with water to form a water repellent bath, comprising by weight 35 to 70 parts paraffin wax having a melting point between 51 and 53° C., 1 to 2 parts octadecylamine, 12 to 20 parts polyvinyl alcohol having a saponification number below 20, 10 to 20 parts water soluble basic aluminum acetate, up to 10 parts sodium diacetate.

5. A solid mixture adapted to be mixed with water to form a water repellent bath, comprising by weight 35 to 70 parts wax, 1 to 2 parts amine emulsion stabilizer, 12 to 20 parts emulsifier consisting of polyvinyl alcohol, and 10 to 20 parts water soluble fatty acid salt of a metal of the group consisting of aluminum and zirconium.

ROBERT R. BURNHAM.
ARNOLD T. ANDERSON.
ARTHUR M. MATHESON.

No references cited.